United States Patent
Moen (10) Patent No.: US 8,752,629 B2
(45) Date of Patent: Jun. 17, 2014

(54) AUTONOMOUS INFLOW CONTROL DEVICE AND METHODS FOR USING SAME

(75) Inventor: Terje Moen, Sandnes (NO)

(73) Assignee: Schlumberger Technology Corporation, Sugar Land, TX (US)

(*) Notice: Subject to any disclaimer, the term of this patent is extended or adjusted under 35 U.S.C. 154(b) by 311 days.

(21) Appl. No.: 13/021,277

(22) Filed: Feb. 4, 2011

(65) Prior Publication Data

US 2011/0198097 A1 Aug. 18, 2011

Related U.S. Application Data

(60) Provisional application No. 61/304,116, filed on Feb. 12, 2010, provisional application No. 61/303,999, filed on Feb. 12, 2010.

(51) Int. Cl.
*E21B 34/06* (2006.01)

(52) U.S. Cl.
USPC ............ 166/321; 166/373; 166/386; 166/320; 166/324; 137/505.13

(58) Field of Classification Search
USPC .................................................... 137/505.13
See application file for complete search history.

(56) References Cited

U.S. PATENT DOCUMENTS

| | | | |
|---|---|---|---|
| 7,240,730 B2 | 7/2007 | Williams | |
| 7,426,962 B2* | 9/2008 | Moen et al. | 166/306 |
| 7,451,809 B2* | 11/2008 | Noske et al. | 166/66 |
| 2002/0189815 A1 | 12/2002 | Johnson | |
| 2006/0131033 A1 | 6/2006 | Bode | |
| 2007/0012454 A1 | 1/2007 | Ross | |
| 2008/0135255 A1 | 6/2008 | Coronado | |
| 2008/0149345 A1 | 6/2008 | Marya | |

(Continued)

FOREIGN PATENT DOCUMENTS

| | | |
|---|---|---|
| RU | 2241853 | 12/2004 |
| SU | 1716099 | 2/1992 |
| WO | 2009/113870 | 9/2009 |
| WO | WO 2009/136796 A1 * | 11/2009 |

OTHER PUBLICATIONS

Zozulja, G.P. et al., "Characteristics of oil and gas production from horizontal wells," 2009, pp. 88-100. Please see attached English translation of Decision on Grant for corresponding RU application for explanation of relevance.

(Continued)

*Primary Examiner* — David Bagnell
*Assistant Examiner* — Caroline Butcher
(74) *Attorney, Agent, or Firm* — Patrick A. Traister; Brandon S. Clark (57) ABSTRACT

A valve assembly for regulating fluid flow in a horizontal wellbore. A housing can be coupled to a production tubular. A chamber is defined within the housing and can be in fluid communication through a flow channel with an inner annulus formed adjacent the wellbore. A piston and a biasing member can be disposed within the chamber, where the biasing member biases the piston into a first position. A flowpath is defined within the housing and communicable with both the production tubular and the inner annulus. The flowpath can include one or more nozzles disposed therein, and the piston can be configured to move between the first position allowing fluid flow through the flowpath to the production tubular and a second position preventing fluid flow to the production tubular.

26 Claims, 4 Drawing Sheets

(56) References Cited

U.S. PATENT DOCUMENTS

| | | |
|---|---|---|
| 2009/0078428 A1* | 3/2009 | Ali ................................ 166/373 |
| 2009/0095484 A1 | 4/2009 | Huang |
| 2009/0095487 A1 | 4/2009 | Xu |
| 2009/0101344 A1 | 4/2009 | Crow |
| 2009/0101352 A1 | 4/2009 | Coronado |
| 2009/0101353 A1 | 4/2009 | Crow |
| 2009/0101354 A1 | 4/2009 | Holmes |
| 2009/0101355 A1 | 4/2009 | Peterson |
| 2009/0151925 A1* | 6/2009 | Richards et al. ................ 166/53 |
| 2009/0211769 A1 | 8/2009 | Assal |
| 2009/0301726 A1 | 12/2009 | Coronado |

OTHER PUBLICATIONS

English translation of the Decision on Grant issued on Nov. 28, 2013 for Russian Patent Application No. 2012138957/03(063010), filed Feb. 7, 2011, 4 pages total. Please note this English translation of the Decision on Grant serves as the explanation of relevance for SU1716099 and the non-patent literature reference listed in item 1 above.

* cited by examiner

AUTONOMOUS INFLOW CONTROL DEVICE AND METHODS FOR USING SAME

CROSS-REFERENCE TO RELATED APPLICATIONS

This application claims benefit of and priority to U.S. provisional patent applications having Ser. Nos. 61/304,116 and 61/303,999 that were both filed on Feb. 12, 2010. The entirety of which are incorporated by reference herein.

BACKGROUND

In recent years, the development and deployment of inflow control devices (hereinafter "ICD") has improved horizontal well production and reserve recovery in new and existing hydrocarbon wells. Indeed, ICD technology has increased reservoir drainage area, reduced water and/or gas coning occurrences, and increased overall hydrocarbon production rates. However, in longer, highly-deviated horizontal wells a continuing difficulty is the existence of non-uniform flow profiles along the length of the horizontal section, especially near well depletion. This problem typically arises as a result of non-uniform drawdown applied to the reservoir along the length of the horizontal section, but also can result from variations in reservoir pressure and the overall permeability of the hydrocarbon formation. Non-uniform flow profiles can lead to premature water or gas breakthrough, screen plugging and/or erosion in sand control wells, and may severely diminish well life and profitability. Likewise, in horizontal injection wells, the same phenomenon applied in reverse may result in uneven distribution of injection fluids that leave parts of the reservoir un-swept, thereby resulting in a loss of recoverable hydrocarbons.

Various intelligent completion methods have also been used to achieve uniform production/injection along the length of the horizontal wellbore. One method includes the use of sophisticated downhole flow control valves and pressure/temperature measurements that allow one to control drawdown and flow rate from various sections of the wellbore. However, this typically requires hydraulic and/or electric control lines that can limit the number of valves used and ultimately add to the overall cost of the completion. Other methods have tried installing pre-set, fixed nozzles configured to provide a pressure drop between the reservoir and the production tubular. Although each nozzle acts as a choke or valve that restricts the flow rate through the system, they are completely passive and have limited control on the actual flow rate through them and cannot adjust the choke size after the completion is in place.

Moreover, the pressure drop versus the flow rate will typically vary in proportion to the degree of reservoir depletion. For example, an ICD completion may initially be optimal for hydrocarbon production, but may subsequently fail to perform ideally as the reservoir pressure depletes. Current ICD designs fail to maintain a desired and consistent flow throughout the depletion of the reservoir, and often result in too high of an injection rate that result in unwanted gas/water coning.

Figure 1:
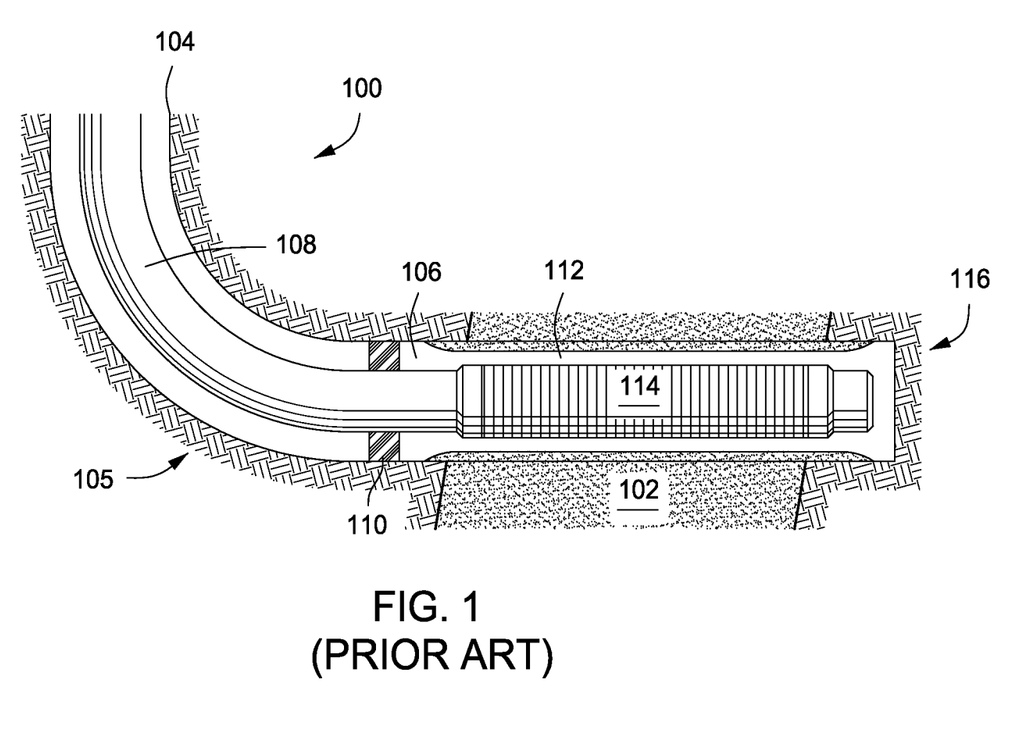
FIG. 1 schematically depicts a conventional well completion assembly configured to remove oil or some other hydrocarbon fluid from a horizontal wellbore 100.

FIG. 1 depicts a conventional well completion assembly configured to remove oil or some other hydrocarbon fluid from an underground reservoir 102. The wellbore 100 typically includes a cased, vertical section 104 joined at a "heel" 105 to an uncased, horizontal section 106. A production tubular 108 for transporting hydrocarbons, or other fluids, to the surface of the wellbore 100 is disposed within the cased wellbore section 104 and extends from the surface of the wellbore 100 through the heel 105 and to a "toe" 116. A packer 110 or other component for sealing off an annular area or wellbore annulus 112 around the production tubular 108 is typically used to isolate the horizontal section 106 therebelow. A completion assembly 114, such as a sand screen or perforated tubing, is normally attached to the production tubular 108 to allow the outflow and inflow of fluids therethrough.

During production, reservoir pressure variations and pressure drop inside the wellbore 100 may cause fluids to be produced or injected at non-uniform rates. This may be especially problematic in longer horizontal wells where pressure drop along the horizontal section 106 of the wellbore 100 causes maximum pressure drop at the heel 105 of the wellbore 100 (closest to the vertical or near vertical part 104) causing the heel 105 to produce or accept injection fluid at a higher rate than at the toe 116 of the wellbore 100 (farthest away from the vertical or near vertical departure point).

There is a need, therefore, for a flow control apparatus for use in a wellbore that compensates for dynamic changes and differences in fluid pressure along the length of the wellbore. There is also a need for a flow control apparatus that is self-regulating and that self-adjusts for changes in pressure differentials between the hydrocarbon formation and the production tubular.

SUMMARY

Valve assemblies for regulating fluid flow in a horizontal wellbore and methods for using the same are provided. In at least one specific embodiment. the valve assembly can include a housing coupled to a production tubular, a chamber defined within the housing and in fluid communication through a flow channel with an inner annulus formed adjacent the wellbore. The valve assembly can further include a piston and a biasing member disposed within the chamber, where the biasing member is adapted to bias the piston into a first position, and a flowpath defined within the housing and communicable with both the production tubular and the inner annulus. The flowpath can include one or more nozzles disposed therein, and the piston can be configured to move between the first position allowing fluid flow through the flowpath to the production tubular and a second position preventing fluid flow to the production tubular.

In another embodiment, the valve assembly can include a housing coupled to a production tubular, and a chamber defined within the housing and having a first end in fluid communication with an inner annulus through a flow channel and a second end in fluid communication with the production tubular through a ventilation channel. The valve assembly can further include a flowpath within the housing that is in fluid communication with both the inner annulus and the production tubular via the chamber. A nozzle can be disposed within the flowpath adjacent the production tubular, and a piston can be disposed within the chamber and adapted to move radially with respect to the production tubular, the piston having a pressure end, a biasing end, and a central portion of reduced cross-section disposed between the pressure and biasing ends. The valve assembly can also include a biasing member disposed within the second end of the chamber to bias the piston into a first position. The piston can be configured to move between the first position allowing fluid flow through the flowpath to the production tubular and a second position preventing fluid flow to the production tubular.

In at least one specific embodiment, the method can include disposing a valve assembly in a wellbore, where the valve assembly has a housing defining a chamber in fluid communication through a flow channel with an inner annulus formed adjacent the wellbore. The method further includes causing a fluid to flow through the valve assembly via a flowpath in fluid communication with a production tubular and the inner annulus, and causing the fluid to act upon a piston via a flow channel in fluid communication with the inner annulus. The piston can be biased into a first position using a biasing member disposed within the chamber. The method also includes axially translating the piston within the chamber towards a second position to choke the flowrate through the valve assembly.

In another embodiment, the method can include disposing a valve assembly in a wellbore, where the valve assembly has a piston disposed within a chamber and the piston has a pressure end, a biasing end, and a central portion of reduced cross-section disposed between the pressure and biasing ends. The method further includes causing a fluid to flow through the valve assembly via a flowpath that is in fluid communication with a production tubular and the wellbore via the chamber. The flowpath can have at least one nozzle disposed therein adjacent the production tubular. The fluid can then act upon the pressure end of the piston via a flow channel in fluid communication with the wellbore. The method also includes biasing the piston into a first position within the chamber using a spring against the biasing end, and translating the piston within the chamber toward a second position to choke the flowrate through the valve assembly.

BRIEF DESCRIPTION OF THE DRAWINGS

So that the recited features can be understood in detail, a more particular description, briefly summarized above, may be had by reference to one or more embodiments, some of which are illustrated in the appended drawings. It is to be noted, however, that the appended drawings illustrate only typical embodiments and are therefore not to be considered limiting of its scope, for the invention may admit to other equally effective embodiments.

DETAILED DESCRIPTION

Figure 2:
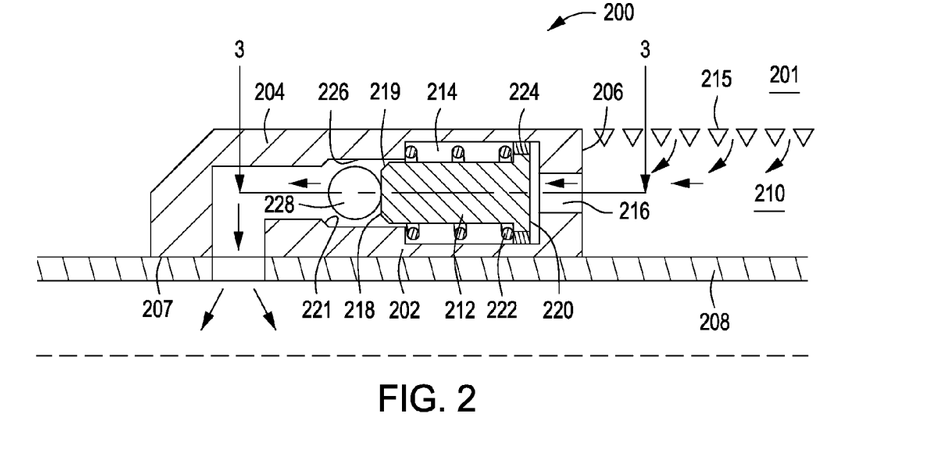
FIG. 2 depicts a partial cross sectional view of an illustrative valve assembly in an open position, according to one or more embodiments described.

FIG. 2 depicts a partial cross sectional view of an illustrative ICD or valve assembly 200, according to one or more embodiments. The valve assembly 200 can be configured to respond to the pressure variations between the inside of the production tubular 208 and the wellbore annulus 201. As illustrated, the valve assembly 200 can include an inner body 202 having an outer manifold or housing 204 disposed thereabout, defining a chamber 214 therebetween. The valve assembly 200 can be disposed on or otherwise attached to a production tubular 208. For example, the inner body 202 can be coupled or otherwise attached to the outside surface of the production tubular 208. The outer manifold 204 can be coupled or otherwise attached to the completion assembly 215 at a first end thereof 206, and also coupled to the production tubular 208 at a second end 207. In one or more embodiments, the inner body 202 and outer manifold 204 can form a monolithic or one-piece housing that can be coupled or otherwise attached to the production tubular 208.

In at least one embodiment, the completion assembly 215 can include a sand screen, as known in the art, that defines an inner annulus 210 radially-offset from the production tubular 208. The inner annulus 210 can be concentric with both the wellbore annulus 201 surrounding the completion assembly 215 and the production tubular 208. In one embodiment, the completion assembly 215 may be entirely omitted so that the valve assembly 200 is placed in direct communication with the wellbore annulus 201.

A piston 212 or other axially-movable member can be disposed in the chamber 214 defined between the inner body 202 and the outer manifold 204. The general shape of the piston 212 can be substantially cylindrical and configured to correspond to a substantially cylindrical chamber 214. As can be appreciated, however, the piston 212 and the chamber 214 can include other corresponding shapes, including elliptical, oval, rectangular, or square configurations, without departing from the scope of the disclosure.

The chamber 214 can be in fluid communication with the inner annulus 210 (e.g., the upstream side) via a flow channel 216. In at least one embodiment, the piston 212 can have a first end or choke end 218 and a second end or biasing end 220. The choke end 218 can be tapered to include a seal surface 219 configured to engage a seat or correspondingly tapered surface 221. As depicted, the tapered surface 221 can be formed in the outer surface of the inner body 202 and the inner surface of the outer manifold 204.

Although the general disposition of the housing (i.e., the inner body 202 and outer manifold 204) and piston 212, as illustrated in FIG. 2, is axially-aligned with the production tubular 208, other disposition configurations are equally viable and also within the scope of the disclosure. For example, the combination housing (i.e., the inner body 202 and outer manifold 204) and piston 212 can also be oriented either radially or tangentially with respect to the production tubular 208, and nonetheless operate properly as described herein.

Figure 3:
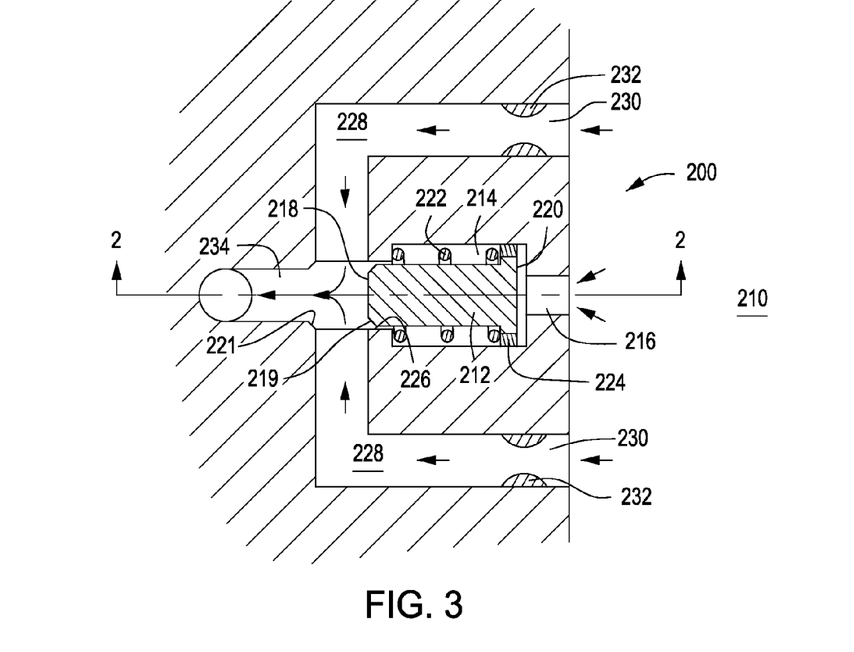
FIG. 3 depicts a section view through lines 3-3 shown in FIG. 2.

A biasing member 222 can also be disposed within the chamber 214. The biasing member 222 can be a spring, a diaphragm, or other axially-expandable devices configured to bias the piston 212 into a first or "open" position within the chamber 214, as depicted in FIGS. 2 and 3. For example, the biasing member 222 can be configured to push on or against a first end or shoulder 224 of the piston 212, adjacent the biasing end 220 of the piston 212, to bias the piston into the first position. In one or more embodiments, the portion of the chamber 214 that houses the biasing member 222 can be ventilated through holes or conduits defined in the piston shoulder 224. Consequently, the biasing member 222 can be in fluid communication with the inner annulus 210 via the shoulder 224 and the flow channel 216.

A substantially cylindrical seal surface 226 may be defined between the inner body 202 and outer manifold 204. In one or more embodiments, the seal surface 226 can have an inside diameter configured to sealingly engage the outside diameter of the piston 212 as the piston 212 moves axially back and forth within the chamber 214. Although not shown, the piston 212 can also include a sealing device, such as an o-ring or a diaphragm, disposed thereabout to sealingly engage the seal surface 226 during piston 212 translation, thereby avoiding critical leakage flow about the piston 212. As a result of the friction created by the sealing engagement, an o-ring or diaphragm could potentially replace the biasing member 222, in at least one embodiment.

During operation, the piston 212 can be adapted to react or respond to the pressure variations incident between the inner annulus 210 (e.g., the upstream side) and the production tubular 208 (e.g., the downstream side). For example, the piston 212 can be configured to translate axially within the chamber 214 to regulate the flow of fluids through an inlet conduit 228 in response to the pressure differential experienced between the upstream and downstream pressures. As can be appreciated, the relative arrangement of the upstream and downstream sides can be reversed in embodiments involving the injection of fluids from the production tubular 208 into the surrounding wellbore annulus 201, such as for wellbore stimulation applications.

Referring to FIG. 3, the conduit 228 can include one or more nozzle ports 230 (two are shown) in fluid communication with the inner annulus 210, or the wellbore annulus 201 in applications where there is no completion assembly 215. Each nozzle port 230 can include one or more nozzles 232 disposed at least partially therein. In operation, the nozzles 232 help provide a controlled pressure drop through each nozzle port 232. In one or more embodiments, the nozzles 232 can be replaced with reduced-area tubing, a tortuous flow path, or similar device that also serves to regulate or control pressure drop.

The inlet conduit 228 can be in fluid communication with one or more outlet conduits 234 that are in fluid communication with the production tubular 208. Thus, the inlet conduit 228 and the outlet conduit 234 can form a continuous flowpath through the chamber 214.

In operation, the valve assembly 200 can be configured to use the pressure differential between the upstream and downstream pressures across the piston 212 to self adjust the flow rate through the inlet and outlet conduits 228, 234. For example, a fluid can flow from the wellbore annulus 201, through the completion assembly 215 (e.g., a sand screen), and into the inner annulus 210 of the valve assembly 200. The inner annulus 210 can simultaneously feed the fluid into the nozzle port(s) 230 and the flow channel 216. Fluid entering the flow channel 216 can provide a force on the un-ventilated portion of the biasing end 220 of the piston 212.

Figure 4:
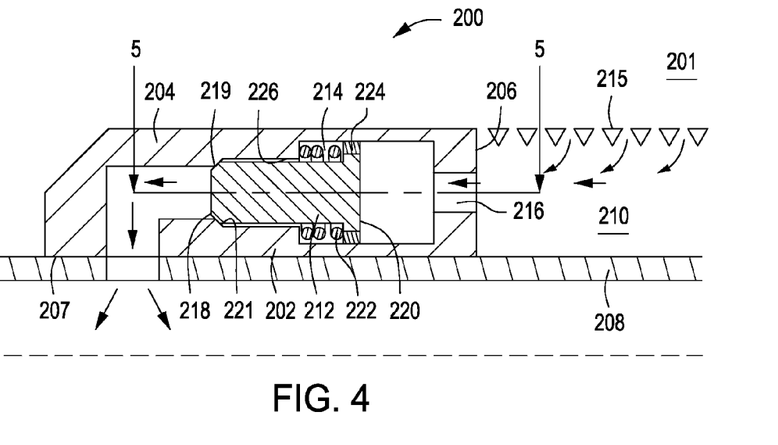
FIG. 4 depicts a partial cross sectional view of the valve assembly depicted in FIGS. 2 and 3, in a closed position, according to one or more embodiments described
Figure 5:
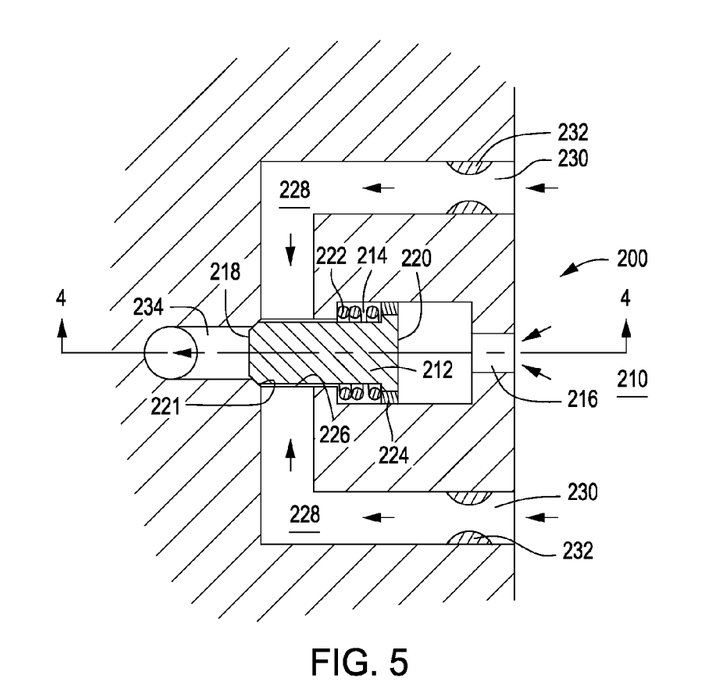
FIG. 5 depicts a section view through lines 5-5 shown in FIG. 4 of the valve assembly in a closed position.

As the fluid flows through the nozzle(s) 232, a pressure drop is generated, thereby creating a pressure differential across the piston 212, between the inner annulus 210 and the interior of the production tubular 208. The increase in the differential pressure proportionally increases the force applied on the un-ventilated portion of the biasing end 220 of the piston 212 via the fluid from the flow channel 216. Consequently, the piston 212 is forced to move axially towards the sealing seat 221, thereby engaging the biasing member 222 which exerts a force in the opposing axial direction. If the pressure drop continues to increase, the fluid pressure through the flow channel 216 can, in due course, overcome the biasing force of the biasing member 222 and force the piston 212 further towards the sealing seat 221 and eventually into a second or "closed" position, as shown in FIGS. 4 and 5. More particularly, FIG. 4 depicts the valve assembly 200 shown in FIG. 2 in the closed position, and FIG. 5 depicts the valve assembly 200 shown in FIG. 3 in the closed position.

As the piston 212 moves towards the sealing seat 221, the choke end 118 of the piston 212 begins to choke, restrict, or otherwise regulate the fluid flow through the inlet conduit(s) 228, thereby reducing the flowrate of fluids through the outlet conduit 234. Regulating the fluid flow through the inlet conduit 228 can result in an increased pressure drop across the piston 212. The increased pressure drop can generate an elevated closing force that increasingly drives the seal surface 219 against the sealing seat 221 and into the closed position, thereby restricting or entirely preventing any fluid flow through the inlet conduit(s) 228. Until the pressures in the upstream and downstream sides equalize, or at least subside to a point where the biasing force of the biasing member 222 can move the piston 212 towards the open position, the piston 212 will remain in the closed position, thereby forcing incoming fluids from the surrounding wellbore annulus 201 to other portions of the production tubular 208. This can prove advantageous during production operations nearing reservoir depletion where unwanted gas/water coning in the more-permeable areas of the reservoir, i.e., where fluid flow may be greater, is generally avoided or prevented.

In another embodiment, the piston shoulder 224 can be a solid structure and configured to sealingly engage the inner surface of the chamber 214 instead of allowing fluid to be ventilated to the biasing member 222. Moreover, the substantially cylindrical seal surface 226 can include an inside diameter adapted to provide fluid flow or ventilation around the choke end 218 of the piston 212 and into the portion of the chamber 214 that houses the biasing member 222. In other words, the outside diameter of the piston 212 and the seal surface 226 can jointly define an annular gap therebetween where fluid can enter and exit the chamber 214, thereby ventilating the biasing member 222. As can be appreciated, this can allow hydraulic pressure in the flow channel 216 to act on the entire surface area of the biasing end 220 of the piston 212. This configuration can further allow an equal and opposing surface area of the piston 212 to be initially acted upon by the pressures incident downstream of the nozzles 232 on the opposite side of the piston 212 (e.g., including the combined surface areas of the choking end 218, seal surface 219, and the inside piston shoulder 224 adjacent the biasing member 222).

In this embodiment, as a fluid flows through the nozzle(s) 232 from the inner annulus 210, a pressure drop is generated, thereby creating a differential pressure across the piston 212 between the wellbore annulus 201 (e.g., the inner annulus 210) and the production tubular 208. This differential pressure increases the pressure acting on the entire surface area of the biasing end 220 of the piston 212 through the flow channel 216. The increasing differential pressure can force the piston 212 toward the sealing seat 221, thereby engaging and compressing the biasing member 222. As the piston 212 moves toward the sealing seat 221, the fluid flow through the inlet conduit 228 is choked, thereby reducing the flowrate through the outlet conduit 234 and further increasing the differential pressure. As can be appreciated, because fluid pressures are acting on equal but opposite surface areas of the piston 212, the piston 212 can behave somewhat like a self-regulating flow valve adapted to maintain flowrate equilibrium through the valve assembly 200. Furthermore, by altering the piston 212 area and manipulating the spring constant of the biasing member 222, the valve assembly 200 can be designed to close at a predetermined flow rate and pressure drop.

If the pressure drop continues to increase, the fluid pressure through the flow channel 216 will eventually overcome the combined biasing forces of the biasing member 222 and the fluid forces acting on the opposite side of the piston 212 (e.g., including the combined surface areas of the choking end 218, seal surface 219, and the piston shoulder 224 adjacent the biasing member 222), thereby forcing the piston 212 further towards the sealing seat 221. As the choke end 218 approaches the sealing seat 221, the differential pressure is increased across the sealing seat 221, thereby providing an added closing force on the piston 212.

Figure 6:
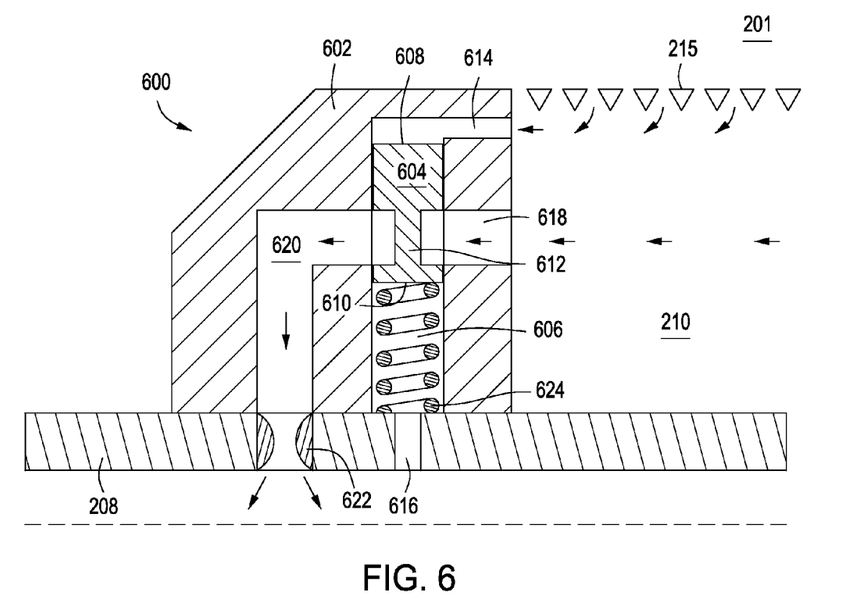
FIG. 6 depicts a partial cross sectional view of another illustrative valve assembly in an open position, according to one or more embodiments described.

FIG. 6 depicts a partial cross sectional view of another illustrative ICD or valve assembly 600, according to one or more embodiments. The valve assembly 600 is similar in some respects to the valve assembly 200 described above with reference to FIGS. 2-5. Accordingly, the valve assembly 600 may be best understood with reference to FIGS. 2-5, where like numerals are used to indicate like components and therefore will not be described again in detail.

The valve assembly 600 can be configured to respond to the pressure variations between the production tubular 208 and the wellbore annulus 201, in combination with the specific flowrate of fluid through the valve assembly 600. As illustrated, the valve assembly 600 can include an outer manifold or housing 602 coupled or otherwise attached to the production tubular 208 and the completion assembly 215.

A piston 604 or other movable member can be disposed within a chamber 606 defined in the outer manifold 602. The general shape of the piston 604 can be substantially cylindrical and configured to correspond to a substantially cylindrical chamber 606. As can be appreciated, however, the piston 604 and the chamber 606 can include other corresponding shapes, including elliptical, oval, rectangular, or square configurations. In an embodiment, the piston 604 can be movable within the chamber 606 in a direction substantially perpendicular (i.e., radial) to the axial length of the production tubular 208. The general shape of the piston 604 can be adapted to sealingly engage the inner walls of the chamber 606 during piston 604 movement or translation. In other embodiments, the piston 604 or chamber 606 can include one or more sealing members or devices, such as an o-ring or a diaphragm, to reduce critical fluid leakage between the piston 604 and the chamber 606.

Although the general disposition of the housing 602 and piston 604, as illustrated in FIG. 6, is generally aligned radially with the production tubular 208, other configurations are contemplated herein without departing from the scope of the disclosure. For example, the piston 604 can also be oriented either axially or tangentially with respect to the production tubular 208, and nonetheless operate properly as described herein. In one or more embodiments, the piston 604 can be configured to translate axially within the chamber 606, with respect to the production tubular 208.

The piston 604 can include a first end or pressure end 608 and a second end or biasing end 610, with a valve rod 612 disposed therebetween. In at least one embodiment, the valve rod 612 can be tapered or otherwise cylindrically-shaped to allow a less turbulent fluid flow around the valve rod 612 during operation. The pressure end 608 can be disposed adjacent or otherwise in fluid communication with a flow channel 614 which fluidly communicates with the inner annulus 210 (e.g., the upstream side). Conversely, the biasing end 610 can fluidly communicate with the production tubular 208 (e.g., the downstream side) via a ventilation channel 616 defined in the production tubular 208. As can be appreciated, the relative arrangement of the upstream and downstream sides can be reversed, for example, in embodiments involving the injection of fluids from the production tubular 208 into the surrounding wellbore annulus 201 for wellbore stimulation applications.

The valve assembly 600 can also include a first conduit or inlet conduit 618 and a second conduit or outlet conduit 620. The inlet conduit 618 can be in fluid communication with the inner annulus 210 (e.g., the wellbore annulus 201) and the chamber 606, and the outlet conduit 620 can be in fluid communication with the chamber 606 and the production tubular 208. Accordingly, the inlet and outlet conduits 618, 620 are in fluid communication via the chamber 606, thereby forming a continuous flowpath through the outer manifold 602, or housing.

In an embodiment, the outlet conduit 620 can include one or nozzles 622 (one is shown) disposed at least partially therein and proximal the inside surface of the production tubular 208. The nozzle(s) 622 help to generate a controlled pressure drop through the valve assembly 600. In one or more embodiments, the nozzle(s) 622 can be replaced with reduced-area tubing, a tortuous flow path, or similar devices configured to regulate or control pressure drop.

Figure 7:
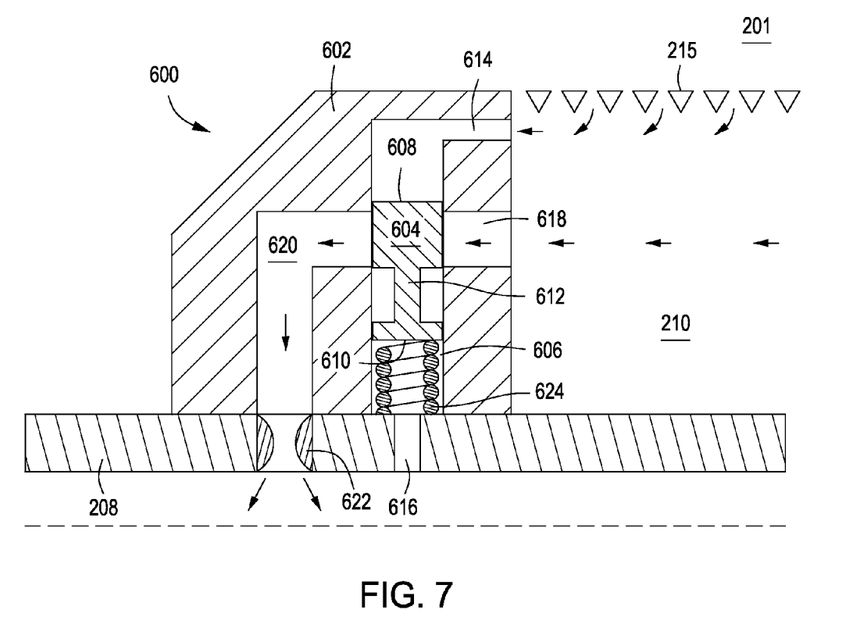
FIG. 7 depicts the valve assembly of FIG. 6 in a closed position.

A biasing member 624 can also be disposed within the chamber 606. Similar to the biasing member 222 described above with reference to FIGS. 2-5, the biasing member 624 can be a spring, diaphragm, or other axially expandable device. In operation, the biasing member 624 can be configured to bias or otherwise compel the piston 604 into a first or "open" position within the chamber 606, as depicted in FIG. 6. The open position can include the valve rod 612 being centrally-located between the inlet and outlet conduits 618, 620, thereby allowing fluid flow around the valve rod 612 from the inlet conduit 618 to the outlet conduit 620, or vice versa. As depicted in FIG. 7, the piston 604 is in a second or "closed" position when the pressure end 608 of the piston 604 substantially restricts or prevents fluid flow between the inlet and outlet conduits 618, 620. As can be appreciated, between the first and second positions, there are several varying positions configured to choke, restrict, or otherwise regulate the flow of fluid to varying degrees between the inlet and outlet conduits 618, 620.

During operation, the valve assembly 600 reacts to the pressure differential between upstream and downstream pressures across the piston 604 and autonomously adjusts the flow rate of fluids through the inlet and outlet conduits 618, 620. In one or more embodiments, a fluid can be drawn through the completion assembly 215 and into the inner annulus 210. The inner annulus 210 can simultaneously feed the fluid into both the flow channel 614 and the inlet conduit 618. Via the flow channel 614, fluid pressure acting on the pressure end 608 of the piston 604 is at least partially offset by the combined biasing forces of the biasing member 624 on the biasing end 610 and the fluid pressure in the tubular 208 which acts on the biasing end 610 via the ventilation channel 616. In one embodiment, these combined forces serve to maintain the piston 604 in the first position, thereby allowing fluid flow through the inlet conduit 618, around the valve rod 612 located in the chamber 606, and into the outlet conduit 620.

As the fluid flows through the nozzle(s) 622 a pressure drop is generated, thereby creating a differential pressure across the piston 604 between the inner annulus 210 (e.g., the upstream side) and the production tubular 208 (e.g., the downstream side). An increase in differential pressure can increase the fluid pressure incident on the pressure end 608 of the piston 604, thereby increasing the force on the piston 604 that opposes the biasing member 624. If the pressure drop continues to increase, fluid pressure through the flow channel 614 can ultimately overcome the combined biasing forces of the biasing member 624 and downstream fluid pressure through the ventilation channel 616, thereby forcing the piston 604 toward the second or "closed" position, as shown in FIG. 7.

As the piston 604 moves toward the second position it chokes and restricts the fluid flow through the flowpath, i.e., between the inlet and outlet conduits 618, 620. As can be appreciated, choking the fluid flowrate can result in an increased pressure drop across the piston 604. Increasing the pressure drop elevates the compressive force applied against the biasing member 624 at the biasing end 608 which further drives the piston 604 to the second position where fluid flow is substantially restricted or prevented through the outlet conduit 620.

Until the pressures incident in the upstream and downstream sides equalize, or at least subside to a point where the combined biasing forces of the biasing member 624 and downstream fluid pressure through the ventilation channel 616 can once again force the piston 604 toward the open position, the piston 604 will remain in the closed position. While in the closed position, the piston 604 forces incoming fluids derived from the wellbore annulus 201 to other areas of the production tubular 208, thereby preventing coning in any particular area along the length of the production tubular 208. During production operations nearing reservoir depletion levels, this can prove useful in preventing unwanted gas/water coning in the more-permeable areas of the reservoir, where fluid flow may be greater.

As can be appreciated, in instances where the pressure drop across the piston 604 fails to force the piston 604 entirely to the closed position, the combined forces of the biasing member 624 and the forces against the piston 604 on both the pressure and biasing ends 210, 212 can, in due course, reach an equilibrium. In other words, the valve assembly 600 can behave somewhat like a self-regulating flow valve adapted to maintain flowrate equilibrium through the valve assembly 600 based on the pressures incident in both the inner annulus 210 and the production tubing 207. Furthermore, by altering the piston 604 area and manipulating the spring constant of the biasing member 624, the valve assembly 600 can be designed to close at a predetermined flow rate and pressure drop.

In one or more embodiments, the completion assembly 215 can include two or more ICDs each having two or more valve assemblies 200, 600 as generally described herein, distributed about the length of the production tubular 208. One or more packers can be used between the completions assemblies 215 and/or between the valve assemblies 200, 600 to provide individual or separated compartments, or "zones." In the event a first fluid flows into one or more first zones, and a second fluid flows into one or more second zones, the pressure in the wellbore annulus 201 may change proportional to the initial pressure in the first zone(s) relative to the pressure in the second zone(s). As can be appreciated, if the second fluid has a different viscosity or density than the first fluid, the pressure drop through the reservoir will be different for the same flow rate.

As generally described herein, the flow control assemblies 200 and 600 can be configured to generate a controlled pressure drop, thereby providing a controlled fluid flow into the production tubular regardless of the types or flow rates of the fluids therethrough. For example, in the event the second fluid has a greater reduction in viscosity relative to an eventual reduction in density, the pressure drop through the reservoir will be relatively smaller than the pressure drop through the valve assembly 200, 600. With the controlled pressure drop created by the nozzles 232, 622 the internal pressure in the production tubular 208 will remain nearly constant. This increased pressure drop across the assembly 200, 600 will cause it to close and consequently prevent the second fluid from entering into the production tubing 208.

It should now be apparent that the valve assembly 200, 600 can provide a constant or predetermined flow throughout the depletion of a hydrocarbon reservoir along the length of the production tubular 208, thereby resulting in optimal hydrocarbon recovery. The valve assembly 200, 600 can also be used for controlled injection operations to reduce and/or eliminate inconsistent fluid injection into the wellbore annulus 201 along the length of the production tubular 208. Moreover, by altering various parameters, such as the surface area of the piston 212, 604, the girth of the flow channel 216, 614, the bore size of the chamber 214, 606, etc., the flow rate dependency through each valve assembly 200, 600 versus the differential pressure dependency can be liberally adjusted to meet specific application constraints.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A valve assembly for use in a wellbore, comprising:
a housing for coupling to a production tubular;
a chamber defined within the housing and in fluid communication with an interior of the production tubular and an exterior of the production tubular;
a piston and a biasing member disposed within the chamber, the biasing member being adapted to bias the piston into a first position; and
first and second flowpaths defined within the housing and providing paths of fluid communication between the interior of the production tubular and the exterior of the production tubular, the first and second flowpaths each having one or more flow restrictions disposed therein for providing a pressure drop across the one or more flow restrictions, wherein the first and second flowpaths each extend from the exterior of the production tubular, around the piston, and converge to a single flowpath proximate the interior of the production tubular when the piston is in the first position, wherein the piston is configured to move from the first position to a second position when a pressure differential between the interior of the production tubular and the exterior of the production tubular exceeds a predetermined amount at least partially in response to the pressure drop from the one or more flow restrictions, and wherein flow from the exterior of the production tubular to the interior of the production tubular through the valve assembly is increasingly restricted as the piston moves from the first position to the second position.

2. The valve assembly of claim 1, wherein the housing comprises an inner body coupled to the production tubular and an outer manifold disposed around the inner body.

3. The valve assembly of claim 1, wherein the biasing member is a spring.

4. The valve assembly of claim 1, wherein the biasing member is a diaphragm.

5. The valve assembly of claim 1, further comprising a sand screen disposed about the production tubular forming an inner annulus therebetween.

6. The valve assembly of claim 1, further comprising:
a ventilated shoulder coupled to the piston to allow the biasing member to be in fluid communication with the exterior of the production tubular through the chamber; and
a seal surface defined by the housing to sealingly engage an outside surface of the piston as the piston moves between the first and second positions.

7. The valve assembly of claim 1, further comprising:
a shoulder coupled to the piston to sealingly engage an inner surface of the chamber as the piston moves between the first and second positions; and
a seal surface defined by the housing downstream from the one or more nozzles, wherein the seal surface is adapted to ventilate the chamber where the biasing member is disposed.

8. The valve assembly of claim 1, wherein a fluid flows from the wellbore and into the production tubular.

9. The valve assembly of claim 1, wherein a fluid flows from the production tubular and into the wellbore.

10. The valve assembly of claim 1, wherein fluid flow through the chamber is obstructed by the piston when the piston is in the first position and when the piston is in the second position.

11. The valve assembly of claim 1, wherein a surface area of the piston in fluid communication with the interior of the production tubular decreases as the piston moves toward the second position.

12. The valve assembly of claim 1, wherein the one or more flow restrictions comprise one or more nozzles.

13. The valve assembly of claim 1, wherein a first end of the piston is exposed to the fluid on the exterior of the production tubular having a first pressure, and a second end of the piston is exposed to the fluid on the interior of the production tubular having a second, different pressure.

14. The valve assembly of claim 1, wherein the pressure differential increases as the flow rate through the first and second flowpaths increases, causing the piston to move from the first position to the second position.

15. A method for regulating a flowrate in a wellbore, comprising:
arranging a valve assembly in the wellbore, the valve assembly having a housing defining a chamber in fluid communication with an interior of a production tubular and an exterior of the production tubular, wherein a piston and a biasing member are disposed within the chamber;
flowing a fluid through first and second flowpaths defined within the housing, wherein the first and second flowpaths extend from the exterior of the production tubular, around the piston, and converge to a single flowpath proximate the interior of the production tubular when the piston is in a first position, the first and second flowpaths each having one or more nozzles disposed therein;
biasing the piston into the first position using the biasing member disposed within the chamber; and
axially translating the piston within the chamber towards a second position to obstruct the single flowpath when a pressure differential between the interior of the production tubular and the exterior of the production tubular exceeds a predetermined amount.

16. The method of claim 15, further comprising:
ventilating the biasing member to the fluid from the exterior of the production tubular through a ventilated shoulder coupled to the piston; and
sealingly engaging an outside surface of the piston to a seal surface defined by the housing as the piston moves between the first and second positions.

17. The method of claim 15, further comprising:
sealingly engaging a shoulder of the piston to an inner surface of the chamber as the piston moves between the first and second positions; and
ventilating the biasing member to the fluid via a gap formed between a seal surface defined by the housing downstream from the one or more nozzles and an outside diameter of the piston.

18. The method of claim 15, further comprising drawing in the fluid from a surrounding hydrocarbon reservoir through a sand screen coupled to the valve assembly.

19. A valve assembly for use in a wellbore, comprising:
a housing for coupling to a production tubular;
a chamber defined within the housing and having a first end in fluid communication with an exterior of the production tubular and a second end in fluid communication with an interior of the production tubular through a first opening in the production tubular;
a flowpath defined within the housing to place the exterior of the production tubular in fluid communication with the interior of the production tubular through a second opening in the production tubular;
a nozzle disposed within the flowpath;
a piston disposed within the chamber and adapted to move radially with respect to the production tubular, the piston having a pressure end, a biasing end, and a central portion of reduced cross-section disposed between the pressure and biasing ends; and
a biasing member disposed adjacent the second end of the chamber and adapted to bias the piston into a first position, wherein the piston is configured to move between the first position allowing fluid flow through the flowpath to the production tubular and a second position preventing fluid flow to the production tubular when a pressure differential between the interior of the production tubular and the exterior of the production tubular exceeds a predetermined amount.

20. The valve assembly of claim 19, wherein the biasing member is a spring.

21. The valve assembly of claim 19, further comprising a sand screen disposed about the production tubular forming an inner annulus therebetween.

22. The valve assembly of claim 19, wherein the chamber and the piston are substantially cylindrical.

23. The valve assembly of claim 22, wherein the chamber sealingly engages an outside surface of the piston.

24. The valve assembly of claim 19, wherein the first opening is adapted to have fluid flow therethrough that exerts a pressure on an end of the piston.

25. A valve assembly, comprising:
a first flow path in fluid communication with an interior of a production tubular and an exterior of the production tubular;
a moveable piston disposed in the first flow path and adapted to prevent fluid flow therethrough, wherein a first side of the piston is in fluid communication with the interior of the production tubular, and wherein a second side of the piston is in fluid communication with the exterior of the production tubular;
a biasing element coupled to the piston and adapted to bias the piston into an open position;
a second flow path in fluid communication with the interior of the production tubular and the exterior of the production tubular, wherein the second flow path has one or more static flow restriction elements disposed therein, and wherein the second flow path is unobstructed by the piston when the piston is in the open position, wherein when a differential pressure between the interior of the production tubular and the exterior of the production tubular exceeds a given value, the piston shifts from the open position to a closed position where the piston at least partially obstructs the second flow path, and wherein the differential pressure is in response to a fluid flow through a reservoir in communication with the exterior of the production tubular and a pressure on the interior of the production tubular.

26. The valve assembly of claim 25, wherein a surface area of the first side of the piston decreases as the piston moves toward the closed position.

\* \* \* \* \*